US00RE45221E

(19) United States
(12) Reissued Patent
Cranford

(10) Patent Number: US RE45,221 E
(45) Date of Reissued Patent: Oct. 28, 2014

(54) PORTABLE TRANSLATION APPARATUS

(71) Applicant: Michael D. Cranford, Alexandria, VA (US)

(72) Inventor: Michael D. Cranford, Alexandria, VA (US)

(21) Appl. No.: 14/186,663

(22) Filed: Feb. 21, 2014

Related U.S. Patent Documents

Reissue of:
(64) Patent No.: 8,204,752
Issued: Jun. 19, 2012
Appl. No.: 12/580,656
Filed: Oct. 16, 2009

(51) Int. Cl.
*G06F 17/28* (2006.01)

(52) U.S. Cl.
USPC ..... 704/277; 704/2

(58) Field of Classification Search
USPC ..... 704/2, 3, 277
See application file for complete search history.

(56) References Cited

U.S. PATENT DOCUMENTS

| | | | | |
|---|---|---|---|---|
| 4,882,681 | A | 11/1989 | Brotz | |
| 5,685,011 | A | 11/1997 | Rosenthal et al. | |
| 5,724,526 | A | 3/1998 | Kunita | |
| 5,991,711 | A | 11/1999 | Seno et al. | |
| 6,175,819 | B1 | 1/2001 | Van Alstine | |
| 6,266,642 | B1 | 7/2001 | Franz et al. | |
| 6,385,568 | B1 | 5/2002 | Brandon et al. | |
| 6,438,524 | B1 | 8/2002 | Shi | |
| D516,052 | S | 2/2006 | Johnson et al. | |
| 2005/0192811 | A1 * | 9/2005 | Parks et al. | 704/277 |
| 2008/0109208 | A1 * | 5/2008 | Curry et al. | 704/3 |

* cited by examiner

*Primary Examiner* — Abul Azad
(74) *Attorney, Agent, or Firm* — Thompson Hine L.L.P.

(57) ABSTRACT

The portable translation apparatus provides a plurality of cases, each with a unique device code. Any case can be in communication with any other case at any time, including multiple cases at once. Directional controls allow a user to push the first directional control, then a language choice followed by a push of a second directional control, followed by a second language choice. This procedure can be repeated for simultaneous communication with many cases at once. Pushing both directional controls simultaneously uses the internal cell phone technology to communicate with the remote data base, which updates the case with any needed updates and also allows cell phone communication with the case. Transceivers in both the case and the earpiece provide for earpiece use, and the case microphone can be used along with or instead of the earpiece. The computer port provides for direct computer communication.

20 Claims, 3 Drawing Sheets

PORTABLE TRANSLATION APPARATUS

Matter enclosed in heavy brackets [ ] appears in the original patent but forms no part of this reissue specification; matter printed in italics indicates the additions made by reissue.

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

While various hand held electronic devices have been offered for the past many years, none provide the translation features and other advantages of the present apparatus.

FIELD OF THE INVENTION

The portable translation apparatus relates to translation devices and more especially to a hand held translator that translates for multiple users and includes cell phone technology.

SUMMARY OF THE INVENTION

The general purpose of the portable translation apparatus, described subsequently in greater detail, is to provide a portable translation apparatus which has many novel features that result in an improved portable translation apparatus which is not anticipated, rendered obvious, suggested, or even implied by prior art, either alone or in combination thereof.

To attain this, the portable translation apparatus provides a plurality of cases, each with a unique device code. Any case can be in communication with any other case at any time, including multiple cases at once. Directional controls allow a user to push the first directional control, then a language choice followed by a push of a second directional control, followed by a second language choice. This procedure can be repeated for simultaneous communication with many cases at once. Pushing both directional controls simultaneously uses the internal cell phone technology to communicate with the remote data base, which updates the case with any needed updates and also allows cell phone communication with the case. Transceivers in both the case and the earpiece provide for earpiece use, and the case microphone can be used along with or instead of the earpiece. The computer port provides for direct computer communication.

Thus has been broadly outlined the more important features of the improved portable translation apparatus so that the detailed description thereof that follows may be better understood and in order that the present contribution to the art may be better appreciated.

An object of the portable translation apparatus is to translate languages bi-directionally.

Another object of the portable translation apparatus is to translate multiple languages simultaneously.

An added object of the portable translation apparatus is to provide cell phone technology.

Still another object of the portable translation apparatus is to provide a remote data base communicable with the cell phone technology.

These together with additional objects, features and advantages of the improved portable translation apparatus will be readily apparent to those of ordinary skill in the art upon reading the following detailed description of presently preferred, but nonetheless illustrative, embodiments of the improved portable translation apparatus when taken in conjunction with the accompanying drawings.

In this respect, before explaining the current embodiments of the improved portable translation apparatus in detail, it is to be understood that the portable translation apparatus is not limited in its application to the details of construction and arrangements of the components set forth in the following description or illustration. Those skilled in the art will appreciate that the concept of this disclosure may be readily utilized as a basis for the design of other structures, methods, and systems for carrying out the several purposes of the improved portable translation apparatus. It is therefore important that the claims be regarded as including such equivalent constructions insofar as they do not depart from the spirit and scope of the portable translation apparatus.

It is also to be understood that the phraseology and terminology employed herein are for purposes of description and should not be regarded as limiting.

DETAILED DESCRIPTION OF THE DRAWINGS

With reference now to the drawings, and in particular FIGS. 1 through 5 thereof, the principles and concepts of the portable translation apparatus generally designated by the reference number 10 will be described.

Figure 1:
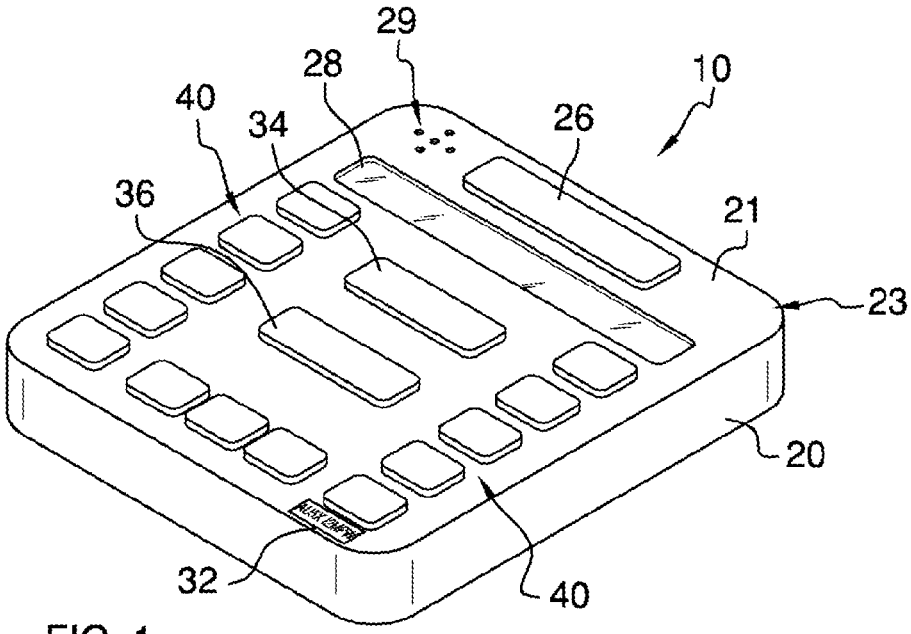
FIG. 1 is a front perspective view.
Figure 2:
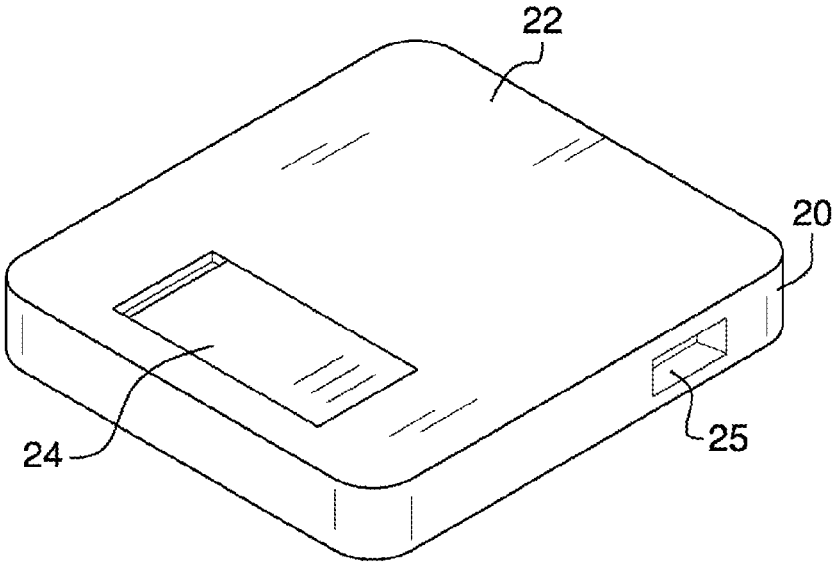
FIG. 2 is a back perspective view
Figure 3:
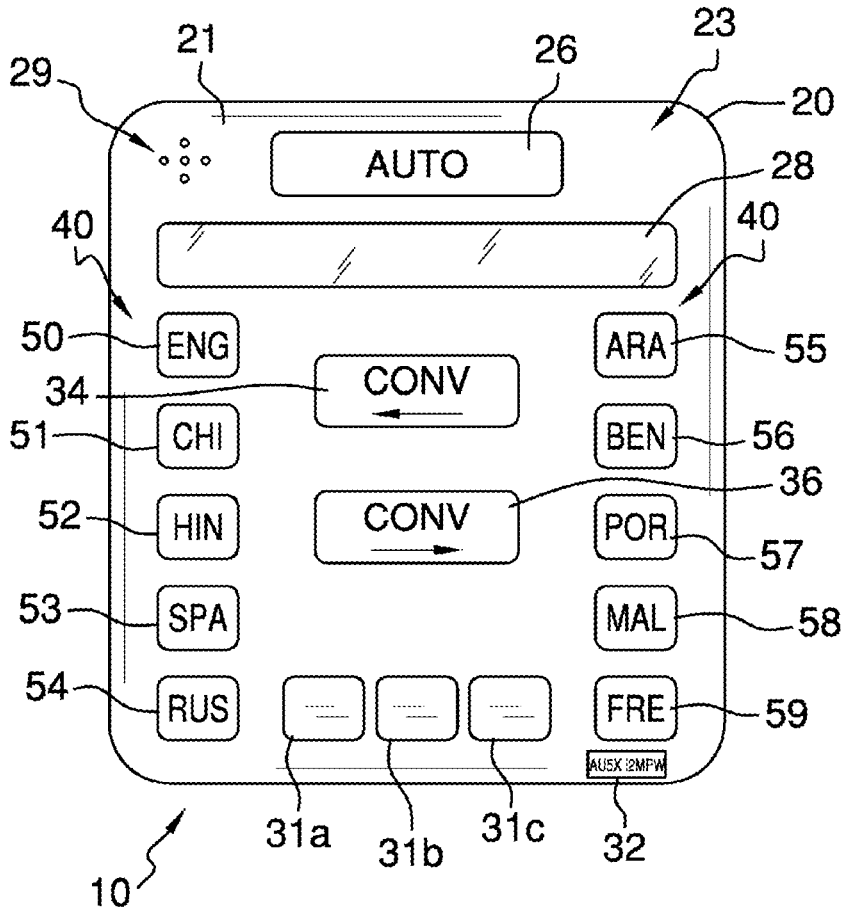
FIG. 3 is a front elevation view.

Referring to FIGS. 1, 2, and 3, the apparatus 10 partially comprises a plurality of identical battery powered parallelepiped cases 20. Each case 20 comprises a front 21 spaced apart from a back 22. A computer port 25 is disposed within the case 20 so that communication with an external computer is provided. The display 23 is disposed within the front 21. The display 23 comprises the voice activation 26 that allows the apparatus 10 to turn on upon hearing a voice command. The language display 28 is adjacent to the voice activation 26.

The language display 28 shows what language is currently in use, both during sending and receiving. The three-digit device code 32 is disposed in proximity to the code buttons that comprise first code button 31a, the second code button 31b, and the third code button 31c. Each case 20 has a unique device code 32. Pushing the code buttons enables communication with another case 20 having the code pushed. The plurality of spaced apart language choices 40 comprise the first language choice 50, the second language choice 51, the third language choice 52, the fourth language choice 53, the fifth language choice 54, the sixth language choice 55, the seventh language choice 56, the eight language choice 57, the ninth language choice 58, and the tenth language choice 59. The microphone 29 is in communication with the CPU 90. The battery pack 24 is accessible from the case 20 back 22.

Referring further to FIG. 3, the pair of directional controls comprises the first directional control 34 spaced apart from the second directional control 36. The first directional control 34 enables one language choice 40 that is to be sent from the case 20. The second directional control 36 is disposed proximal to the first directional control 34. Each push of the second directional control 36 followed by a push of one of the plurality of language choices 40 enables one language for communication with the first directional control 34 language choice 40. For example, the first directional control 34 is pushed, followed by a push of first language 50. The second directional control 36 is pushed, followed by a push of the eighth language 57.

The language choices 40 may be further used to involve more than just two cases 20 in communication. For example, the second directional control 36 can be pushed again, followed by the sixth language 55, and so on. This important advantage enables several individuals to communicate at the same time, with each hearing the language of the first directional control 34 of their particular case 20.

Figure 5:
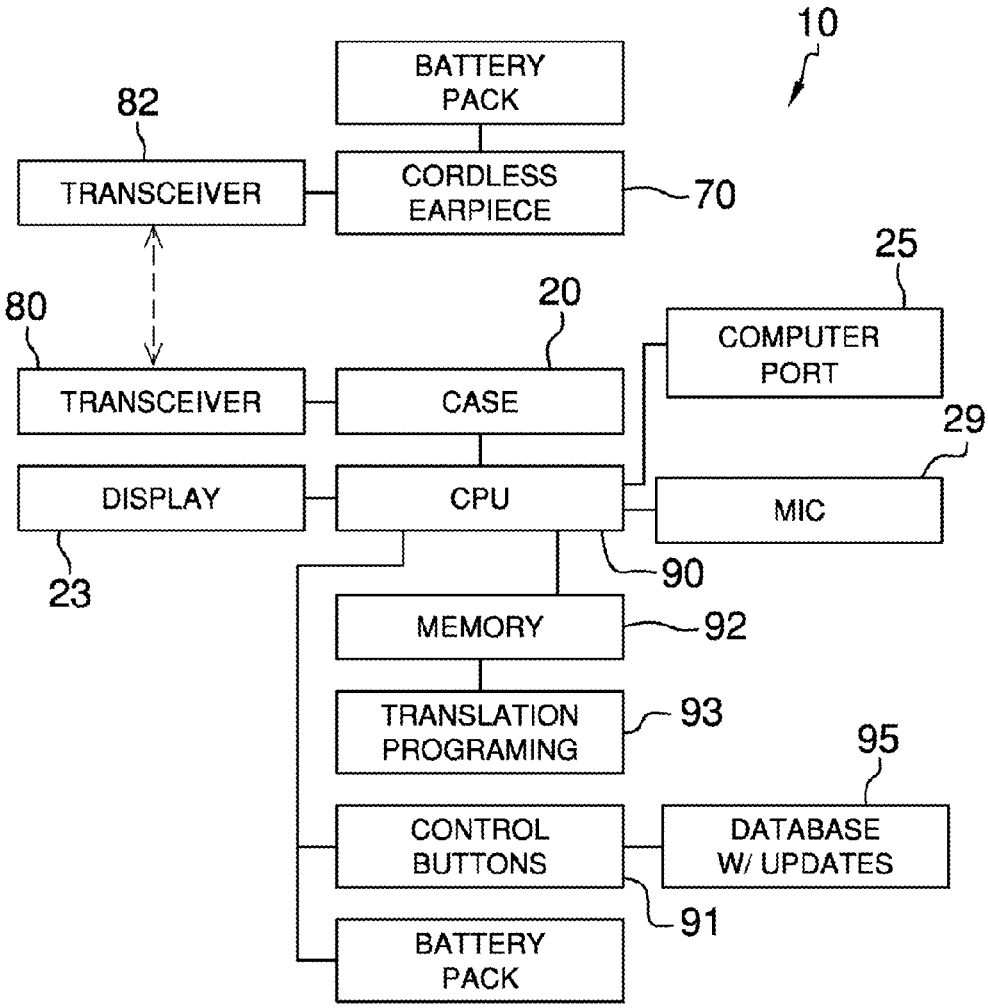
FIG. 5 is a schematic block diagram of the apparatus.

Referring to FIG. 5 and continuing to refer to FIG. 3, the CPU 90 is disposed within each case 20. The CPU 90 further comprises a translation programming 93 and a memory 92. The CPU 90 is in communication with the display 23. The first transceiver 80 is disposed within the case 20. The first transceiver 80 is matched to the case 20 device code 32. The first transceiver 80 is in communication with the CPU 90.

Figure 4:
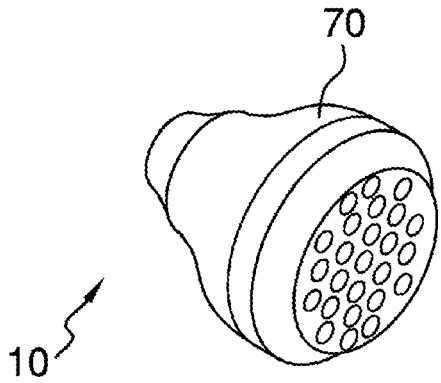
FIG. 4 is a perspective view of the wireless earpiece.

Continuing to refer to FIGS. 3 and 5 and referring also to FIG. 4, each battery powered wireless earpiece 70 is matched to ease case 20. The second transceiver 82 is disposed within each earpiece 70. Each second transceiver 82 is matched to and in communication with each first transceiver 80 of each unique device code 32 of each case 20. Cell phone capability is disposed within each case 20. The cell phone capability is in communication with the CPU 90 and the directional controls. The remote data base 95 is provided. Pushing the directional controls simultaneously dials the remote data base 95.

With respect to the above description then, it is to be realized that the optimum dimensional relationships for the parts of the portable translation apparatus, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the portable translation apparatus.

Directional terms such as "front", "back", "in", "out", "downward", "upper", "lower", and the like may have been used in the description. These terms are applicable to the embodiments shown and described in conjunction with the drawings. These terms are merely used for the purpose of description in connection with the drawings and do not necessarily apply to the position in which the portable translation apparatus may be used.

Therefore, the foregoing is considered as illustrative only of the principles of the portable translation apparatus. Further, since numerous modifications and changes will readily occur to those skilled in the art, it is not desired to limit the portable translation apparatus to the exact construction and operation shown and described, and accordingly, all suitable modifications and equivalents may be resorted to, falling within the scope of the portable translation apparatus.

What is claimed is:

[1. A portable translation apparatus, comprising, in combination:

a plurality of identical battery powered parallelepiped cases, each case comprising:

a front spaced apart from a back;

a computer port disposed within the case;

a display disposed within the front, the display comprising:

a voice activation;

a language display;

a three-digit device code unique to each case;

a plurality of spaced apart code buttons, the code buttons comprising a first code button, a second code button, a third code button;

whereby the code buttons enable communication with each case with unique device code, the communication possible with a plurality of other cases simultaneously;

a plurality of spaced apart language choices;

a pair of directional controls comprising a first directional control spaced apart from a second directional control, the first directional control enabling one language choice, an each push of the second directional control followed by a push of one of the plurality of language choices enabling one language for communication with the first directional control language choice;

a CPU within the case, the CPU further comprising a translation programming and a memory, the CPU in communication with the display;

a first transceiver within the case, the first transceiver matched to the case device code, the first transceiver in communication with the CPU;

a battery powered wireless earpiece matched to ease case;

a second transceiver disposed within each earpiece, each second transceiver matched to and in communication with each first transceiver of each unique device code.]

[2. The apparatus according to claim 1 wherein the plurality of language choices further comprises ten language choices.]

[3. The apparatus according to claim 2 further comprising a microphone in the front, the microphone in communication with the CPU.]

[4. The apparatus according to claim 3 wherein the plurality of language choices further comprises ten language choices.]

[5. The apparatus according to claim 4 further comprising a microphone in the front, the microphone in communication with the CPU.]

[6. A portable translation apparatus, comprising, in combination:

a plurality of identical battery powered parallelepiped cases, each case comprising:

a front spaced apart from a back;

a computer port disposed within the case;

a display disposed within the front, the display comprising:

a voice activation;

a language display;

a three-digit device code unique to each case;

a plurality of spaced apart code buttons, the code buttons comprising a first code button, a second code button, a third code button;

whereby the code buttons enable communication with another case, the communication possible with a plurality of other cases simultaneously;

a plurality of spaced apart language choices;

a pair of directional controls comprising a first directional control spaced apart from a second directional control, the first directional control enabling one language choice, an each push of the second directional control followed by a push of one of the plurality of language choices enabling one language for communication with the first directional control language choice;

a microphone;

a CPU within the case, the CPU further comprising a translation programming and a memory, the CPU in communication with the display;

a first transceiver within the case, the first transceiver matched to the case device code, the first transceiver in communication with the CPU;

a battery powered wireless earpiece matched to ease case;

a second transceiver disposed within each earpiece, each second transceiver matched to and in communication with each first transceiver of each unique device code;

a cell phone capability within the case, the cell phone capability in communication with the CPU and the directional controls;

a remote data base;

whereby pushing the directional controls simultaneously dials the remote data base.]

*7. A portable translation apparatus for spoken language, comprising:*

*a first case and a second case, wherein each of the first case and the second case comprises:*

*a microphone;*

*a device code unique thereto;*

*a display comprising:*

*a device code selection member enabling communication between the first and second cases based on the unique device code of each;*

*a language selection member;*

*a directional control coupled to the language selection member and enabling a native language selection and a foreign language selection using the language selection member;*

*a CPU in communication with the microphone and the display, the CPU comprising a translation programming and a memory, wherein the translation programming receives spoken native language through the microphone and translates the native language to the foreign language; and*

*a first transceiver matched to the device code and in communication with the CPU, wherein the first transceiver sends the foreign language from the first case to the second case; and*

*a first audio speaker matched to the first case and in communication with the CPU therein; and*

*a second audio speaker matched to the second case and in communication with the CPU therein;*

*wherein each of the audio speakers plays a translation of the foreign language received by the CPU as the native language;*

*wherein each of the first case and the second case further comprises cell phone capability therein in communication with the CPU and the directional control.*

*8. The portable translation apparatus of claim 7, wherein each of the first case and the second case further comprises a language display coupled to the CPU and the language selection member.*

*9. The portable translation apparatus of claim 7, wherein each of the first case and the second case comprises a battery.*

*10. The portable translation apparatus of claim 7, wherein each of the first case and the second case comprises a computer port in communication with the CPU.*

*11. The portable translation apparatus of claim 7, wherein each of the first and second audio speakers comprises an earpiece.*

*12. The portable translation apparatus of claim 11, wherein the earpiece is cordless and comprises a second transceiver.*

*13. The portable translation apparatus of claim 7, wherein the directional control of each of the first case and the second case comprises a first directional control for selection of the native language and a second directional control for selection of the foreign language.*

*14. The portable translation apparatus of claim 13, further comprising a third case and a third audio speaker matched to the third case, the third case comprising:*

*a microphone;*

*a device code unique thereto;*

*a display comprising:*

*a device code selection member enabling communication with the first and second cases based on the unique device code of each;*

*a language selection member;*

*a directional control coupled to the language selection member and enabling a native language selection and a foreign language selection using the language selection member, wherein the directional control comprises a first directional control for selection of the native language and a second directional control for selection of the foreign language;*

*a CPU in communication with the microphone and the display, the CPU comprising a translation programming and a memory, wherein the translation programming receives spoken native language through the microphone and translates the native language to the foreign language; and*

*a first transceiver matched to the device code and in communication with the CPU, wherein the first transceiver sends the foreign language from the third case to one or more of the first and second cases; and*

*wherein the third audio speaker is in communication with the CPU within the third case and plays a translation of the foreign language received by the CPU as the native language;*

*wherein the second directional control of each of the first, second, and third cases is coupled to the device code selection member therein thereby enabling the selection of different foreign languages for each case based on the unique device code thereof.*

*15. The portable translation apparatus of claim 7, wherein each of the first and second cases further comprises a voice activation control.*

*16. The portable translation apparatus of claim 13, wherein each of the first and second cases dials a remote database when the first and second directional controls are activated simultaneously.*

*17. A portable translation apparatus for spoken language, comprising:*

*a first case and a second case, wherein each case comprises:*

*a microphone;*

*a device code unique thereto;*

*a display comprising:*

*a device code selection member enabling communication between the cases based on the unique device code of each;*

*a language selection member;*

*a directional control coupled to the language selection member and enabling a native language selection and a foreign language selection using the language selection member;*

*a CPU in communication with the microphone and the display, the CPU comprising a translation programming and a memory, wherein the translation programming receives spoken native language through the microphone and translates the native language to the foreign language; and*

*a first transceiver matched to the device code and in communication with the CPU, wherein the first transceiver sends the foreign language from the first case to the second case; and*

*a first audio speaker matched to the first case and in communication with the CPU therein; and*

*a second audio speaker matched to the second case and in communication with the CPU therein;*

*wherein each of the audio speakers plays a translation of the foreign language received by the CPU as the native language.*

*18. The portable translation apparatus of claim 17, wherein each of the first case and the second case further comprises a language display coupled to the CPU and the language selection member.*

*19. The portable translation apparatus of claim 17, wherein each of the first case and the second case comprises a battery.*

*20. The portable translation apparatus of claim 17, wherein each of the first case and the second case comprises a computer port in communication with the CPU.*

*21. The portable translation apparatus of claim 17, wherein each of the first and second audio speakers comprises an earpiece.*

*22. The portable translation apparatus of claim 21, wherein the earpiece is cordless and comprises a second transceiver.*

*23. The portable translation apparatus of claim 17, wherein the directional control of each of the first case and the second case comprises a first directional control for selection of the native language and a second directional control for selection of the foreign language.*

*24. The portable translation apparatus of claim 23, further comprising a third case and a third audio speaker matched to the third case, the third case comprising:*

*a microphone;*

*a device code unique thereto;*

*a display comprising:*

*a device code selection member enabling communication with the first and second cases based on the unique device code of each;*

*a language selection member;*

*a directional control coupled to the language selection member and enabling a native language selection and a foreign language selection using the language selection member, wherein the directional control comprises a first directional control for selection of the native language and a second directional control for selection of the foreign language;*

*a CPU in communication with the microphone and the display, the CPU comprising a translation programming and a memory, wherein the translation programming receives spoken native language through the microphone and translates the native language to the foreign language; and*

*a first transceiver matched to the device code and in communication with the CPU, wherein the first transceiver sends the foreign language from the third case to one or more of the first and second cases; and*

*wherein the third audio speaker is in communication with the CPU within the third case and plays a translation of the foreign language received by the CPU as the native language;*

*wherein the second directional control of each of the first, second, and third cases is coupled to the device code selection member therein thereby enabling the selection of different foreign languages for each case based on the unique device code thereof.*

*25. The portable translation apparatus of claim 17, wherein each of the first and second cases further comprises a voice activation control.*

*26. The portable translation apparatus of claim 23, wherein each of the first and second cases dials a remote database when the first and second directional controls are activated simultaneously.*

* * * * *